US006248364B1

(12) United States Patent
Sengupta et al.

(10) Patent No.: US 6,248,364 B1
(45) Date of Patent: Jun. 19, 2001

(54) ENCAPSULATION PROCESS AND ENCAPSULATED PRODUCTS

(75) Inventors: Ashok Sengupta, London; Kent E. Nielsen, Dorchester; Galina Barinshteyn, London, all of (CA); Kai Li, Arcadia, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/834,937

(22) Filed: Apr. 7, 1997

(51) Int. Cl.[7] .............................. A01N 25/14; A61K 9/16; A61K 47/34; B01J 13/16
(52) U.S. Cl. .......................... 424/501; 424/408; 264/4.7
(58) Field of Search ..................... 424/451, 408, 424/501; 264/4.7; 528/902; 428/402.21; 523/122

(56) References Cited

U.S. PATENT DOCUMENTS

| 3,577,515 | 5/1971 | Vandegaer ............................ 424/32 |
|---|---|---|
| 3,917,711 | 11/1975 | Roelofs ................................ 260/601 |
| 4,046,741 | 9/1977 | Scher .................................. 260/77.5 |
| 4,140,516 | 2/1979 | Scher ...................................... 71/88 |
| 4,285,720 | * 8/1981 | Scher . |
| 4,417,916 | 11/1983 | Beestman ................................ 71/93 |
| 4,487,759 | 12/1984 | Nesbitt ................................. 424/32 |
| 4,534,783 | * 8/1985 | Beestman . |
| 4,557,755 | 12/1985 | Takahashi ............................. 71/100 |
| 4,563,212 | 1/1986 | Becher ................................. 71/118 |
| 4,632,829 | 12/1986 | Hedin .................................... 424/84 |
| 4,670,250 | 6/1987 | Baker ................................... 424/419 |
| 4,681,806 | * 7/1987 | Matran et al. . |
| 4,783,502 | * 11/1988 | Faler et al. . |
| 5,026,874 | * 6/1991 | Larkin et al. . |
| 5,332,584 | 7/1994 | Scher .................................. 424/408 |

FOREIGN PATENT DOCUMENTS

| 1044134 | 12/1978 | (CA) . | |
|---|---|---|---|
| 1179682 | 12/1984 | (CA) . | |
| 00407257 | 1/1991 | (EP) . | |
| 611253 | 1/1994 | (EP) . | |
| 1371179 | 10/1974 | (GB) . | |
| 250850 | 2/1994 | (NZ) | .............................. B01J/13/14 |
| WO 81/02505 | 9/1981 | (WO) | .............................. A01N/25/22 |
| WO 96/33611 | 10/1996 | (WO) . | |

* cited by examiner

Primary Examiner—Edward J. Webman
(74) Attorney, Agent, or Firm—Dale A. Bjorkman

(57) ABSTRACT

A process for encapsulating a partially water-miscible organic material within a polyurea or polyurethane shell is provided utilizing a water-soluble tertiary amine in the reaction dispersion. Microcapsules and methods of using microcapsules are also provided.

13 Claims, No Drawings

ENCAPSULATION PROCESS AND ENCAPSULATED PRODUCTS

This invention relates to a process for encapsulation of materials that are partially water-miscible. One application of the invention involves encapsulation of materials that will modify the behaviour of animal species, for example semiochemicals such as pheromones, and their use for pest-control in forestry, agriculture or horticulture.

BACKGROUND OF THE INVENTION

Use of interfacial condensation to encapsulate substances such as pharmaceuticals, pesticides and herbicides is discussed in U.S. Pat. No. 3,577,515, issued on May 4, 1971. The encapsulation process involves two immiscible liquid phases, one being dispersed in the other by agitation, and the subsequent polymerization of monomers from each phase at the interface between the bulk (continuous) phase, and the dispersed droplets. The immiscible liquids are typically water and an organic solvent. Polyurethanes and polyureas are included in the types of materials suitable for producing the microcapsules. The use of emulsifying agents (also known as suspending or dispersing agents) is also discussed. The United States patent discloses formation of microcapsules comprising a polymeric sphere and a liquid centre, ranging from 30 micron to 2 mm in diameter, depending on monomers and solvents used.

United Kingdom Patent No. 1,371,179 discloses the preparation of polyurea capsules for containing dyes, inks, chemical reagents, pharmaceuticals, flavouring materials, fungicides, bactericides and pesticides such as herbicides and insecticides. The capsules are prepared from various di- and polyisocyanates in a dispersed organic phase. Some of the isocyanate present reacts to yield an amine which reacts further with remaining isocyanate at the interface with water and subsequently polymerizes to form a polyurea shell. The aqueous phase also contains a surfactant, for example an ethoxylated nonylphenol or a polyethylene glycol ether of a linear alcohol. In addition, the aqueous phase contains protective colloids, typically polyacrylates, methylcellulose and PVA. Particle sizes as low as 1 micron are exemplified. Encapsulation of insect hormones and mimics are among the systems mentioned.

U.S. Pat. No. 4,046,741 and U.S. Pat. No. 4,140,516 appear to relate to developments of the process disclosed in United Kingdom Patent No. 1,371,179. According to U.S. Pat. No. 4,046,741, a problem with microcapsules is instability caused by evolution of carbon dioxide from residual isocyanate entrapped in the microcapsules. U.S. Pat. No. 4,046,741 discloses a post-treatment of polyurea microcapsules with ammonia or an amine such as diethylamine. This removes the residual isocyanate, allowing subsequent storage of the microcapsules at lower pH's without generation of carbon dioxide. U.S. Pat. No. 4,140,516 discloses the use of quaternary salts as phase transfer catalysts to speed up the formation of polyurea microcapsules.

U.S. Pat. No. 4,417,916 discloses encapsulation of water-immiscible materials such as herbicides in a polyurea shell. A polyisocyanate and a polyamine are used to form the polyurea, and the invention appears to reside in the use of a lignin sulfonate compound as emulsifier in the polyurea-forming reaction. The concentration range of water-immiscible material encapsulated in the examples listed is 320 to 520 g/L of composition.

U.S. Pat. No. 4,563,212 is similar in teaching to U.S. Pat. No. 4,417,916, but uses emulsifiers other than lignin sulfonates, particularly sulfonated naphthalene formaldehyde condensates and sulfonated polystyrenes.

European Patent No. 611 253 describes reaction of polyisocyanates and polyamines to encapsulate materials such as pesticides in polyurea, using non-ionic surfactants that are block copolymers containing hydrophillic blocks together with hydrophobic blocks.

Canadian Patent No. 1,044,134 is concerned with microencapsulation of insecticides, particularly pyrethroids. The insecticide is dissolved, together with a polyisocyanate, in a water-immiscible organic solvent. The solution in organic solvent is then dispersed in water by agitation, and a polyfunctional amine is added while agitation is continued. The polyisocyanate and the polyfunctional amine react to form a polyurea shell wall that surrounds the dispersed droplets containing the insecticide.

Canadian Patent No. 1,179,682 discusses encapsulation of pheromones. Microcapsules containing pheromones are produced from toluene diisocyanate and ethylene diamine and/or diethylene triamine. In one described embodiment, a polyamine in the form of a salt is added to a dispersion of isocyanate, to allow polymerization to be initiated by addition of a base. It is said that this may improve the stabilization of behaviour modifying compounds that are aldehydes, but this is not exemplified. Canadian Patent No. 1,179,682 states that pheromones are photolabile and lose efficacy after exposure to sunlight. A tertiary phenylene diamine is used as a light stabilizer, and is added with the water-immiscible phase so that it is ultimately encapsulated with the pheromone.

SUMMARY OF THE INVENTION

In one aspect the present invention provides a process for encapsulating a partially water-miscible organic material within a polyurea or polyurethane shell, which process comprises:
(a) providing an aqueous phase containing a surfactant;
(b) dispersing in said aqueous phase a water-immiscible organic solvent in which the partially water-miscible material to be encapsulated and a polyisocyanate are dissolved or dispersed, to form a dispersion of droplets of organic solvent in the continuous aqueous phase;
(c) adding to the dispersion a water-soluble tertiary amine;
(d) thereafter adding to the dispersion a polyfunctional compound containing functional groups selected from the group consisting of primary amine, secondary amine and hydroxy groups, whereby there is formed discrete capsules composed of the material encapsulated in a polyurea or polyurethane shell.

In another aspect the invention provides microcapsules composed of a material encapsulated within a polyurea or polyurethane shell, which microcapsules contain a water-soluble tertiary amine. In one preferred embodiment the encapsulated material is a partially water-miscible material and the amount of the partially water miscible material encapsulated is at least 5%, preferably at least 90%, based on the total weight of microcapsules.

In another aspect the invention provides microcapsules composed of a partially water-miscible organic material of molecular weight greater than about 100 and less than about 400 and containing at least one heteroatom, encapsulated within a polyurea or polyurethane shell, the amount of the said material encapsulated being at least 5%, preferably at least 9%, based on the total weight of the microcapsules.

DESCRIPTION OF THE PREFERRED EMBODIMENTS

The invention is concerned particularly, but not exclusively, with encapsulation of partially water-miscible organic molecules of compounds that have a molecular weight in the range of about 100 to about 400, especially about 150 to 300. The compounds contain a heteroatom that confers some degree of water-miscibility. For many compounds of interest the sole heteroatom is oxygen, and there may be up to three heteroatoms per molecule in, for instance, hydroxy-substituted or keto-substituted carboxylic acids. Unsubstituted carboxylic acids of course contain two oxygen atoms and simple aldehydes, ketones and ethers contain only one oxygen atom. Compounds that contain nitrogen and/or sulphur atoms are also of interest, however.

The compounds are released gradually over time from the microcapsules. This contrasts with microcapsules that release the active ingredient at one time when the shell of the microcapsule is ruptured. The encapsulated compounds may be aldehydes, alcohols, epoxy compounds, ethers, ketones, especially reactive ketones in which the double bond of the carbonyl group is conjugated with one or more double bonds, for example acetophenone where the carbonyl group is conjugated with double bonds of the aromatic ring. Of particular interest are biologically active compounds. For purposes of the present invention, the term "biologically active" means materials that affect the life processes of organisms. Materials that are biologically active include herbicides, pesticides, pharmaceuticals, and semiochemicals, including naturally and artificially produced pheromones. Materials of this nature that are of particular interest are those materials that interfere with a life process essential to the survival of a target pest.

Pheromones may be defined as compounds which, when naturally produced, are secreted by one member of an animal species which can influence the behaviour or development of another member of the same animal species. Pheromones are species-specific and therefore the application of pheromones for insect behaviour modification has minimal effect on non-target pests. Pheromones supplied for modification of insect behaviour interfere with the "mate finding process" by releasing point sources of pheromone, which may compete with or camouflage the pheromone plume of a female. This latter type of action differs from chemical insecticides or insect growth regulators or hormones, in that pheromones target future generations of insects, not present ones. As pheromones are very species-specific and are used only in small quantities, their use is more environmentally acceptable than broadcasting of pesticides.

It is known to use pheromones to interfere with insect mating by, for instance, impregnating hollow fibres, plastic laminate flakes or twist-ties with a pheromone and then physically attaching the fibres or ties to plants to be protected from insect infestation. This process is labour-intensive and is suitable for protecting small areas, for instance orchards, but it is unsuitable for protecting large areas of forest. Not only would the labour cost be prohibitive, but also it may be impossible to cover a large area of forest within a time window that is created by the mating season of a target insect. To cover large areas use can be made of aerial spraying.

For, spraying, particularly aerial spraying, it is desirable or essential that the microcapsules have certain characteristics. Ideally they remain in suspension in water, so that maintaining them in suspension in tanks in an aircraft does not cause difficulty. If the microcapsules do not remain in suspension there is a likelihood that they will sink from suspension and coagulate, and, while this can be prevented at least to some extent by agitation, the necessity for providing agitation is one more disadvantage. To atomize the suspension when it is sprayed, the suspension is forced through two rotating perforated discs that are immediately upstream of the discharge nozzle. To minimize damage as the microcapsules pass through the discs, it is desirable that they display a degree of elasticity. Owing to the handling to which the microcapsules are subjected, and to the desired slow release over time of the encapsulated material, it is desirable that the shell of the microcapsules of the present invention should be somewhat elastic, and not frangible. The present invention provides microcapsules suitable for this purpose.

Compounds of interest in the lower end of the above molecular weight range include mercaptans. Some compounds mark territory by means of urine, to discourage other animals from entering that territory. Examples of such animals include preying animals such as wolves, lions, dogs, etc. Ingredients in the urine of such animals include mercaptans. By dispersing microcapsules containing the appropriate mercaptans it is possible to define a territory and discourage particular animals from entering that territory. For example, the urine of a wolf includes a mercaptan, and distribution of microcapsules from which this mercaptan is gradually released to define a territory will discourage deer from entering that territory. Other materials that can be encapsulated and used to discourage approach of animals include essences of garlic, putrescent eggs and capsaicin.

Other compounds that can be included in the microcapsules of the invention include perfumes, fragrances, flavouring agents and the like.

The invention is particularly useful for encapsulating materials that are partially water-miscible. While the limits on what is meant by "partially miscible" are not precise, in general a substance is considered to be water-immiscible if its solubility in water is less than about 0.5% by weight. It is considered to be water-soluble if its solubility is greater than 98%, i.e., if 1 gram of the substance is put in 100 grams of water, 0.98 gram would dissolve. A substance whose solubility falls between these approximate limits is considered to be partially water-miscible.

The invention is particularly concerned with encapsulation of partially water-miscible alcohols, aldehydes, carboxylic acids, ketones, ethers, including epoxy compounds, and mercaptans. In the past it has proven difficult to achieve high degrees of encapsulation of materials that have some degree of water solubility, as the material partitions between the small amount of organic solvent and the relatively larger amount of water that constitutes the continuous phase. Furthermore, these compounds can be expected to react with the reactants used to encapsulate. Aldehydes and ketones react with amines to form aldimines and ketimines, respectively. Alcohols, carboxylic acids and mercaptans react with isocyanates. Epoxy compounds react both with amines and with isocyanates. It is therefore surprising that, with the addition of tertiary amine in accordance with the invention these materials can be encapsulated with the formation of discrete capsules.

Preferred embodiments of the invention are described with reference to encapsulation of partially water-miscible pheromones, but it should be appreciated that the invention extends to encapsulation of materials other than such pheromones and to microcapsules containing materials other than pheromones. Those materials may, or may not, be biologically active.

Pheromones can be classified broadly in terms of water solubility as either insoluble, i.e., immiscible, or partially water-miscible. Many pheromones have an ester terminal group, for example and acetate or formate group, and, in general, these are water-immiscible and incorporation of them into microcapsules by known methods presents no particular problem. Many other pheromones have an aldehyde or an alcohol terminal group and, in general, these are partially water-miscible and potentially reactive with the reactants used to encapsulate.

By means of the invention it is possible to encapsulate partially water-soluble pheromones in enhanced amount and with longer effective life, as compared with Canadian Patent No. 1,179,682. This is particularly remarkable as Patent No. 1,179,682 demonstrates encapsulation only of acetate-terminated pheromones which are water-immiscible and whose encapsulation does not present difficulty owing to partial water-solubility, nor difficulty owing to reactivity as esters are not reactive with isocyanates or amines. The mean particle size range demonstrated in the Canadian patent is 1–5 microns. The microcapsules produced tend to sink to the bottom of the reaction vessel and form a coagulum. Another drawback of this system is that the pheromone appears to be encapsulated in only small amount. Example 4 is the only example that actually demonstrates encapsulation. The encapsulated pheromones are water-immiscible acetate compounds that are present in the original reaction mixture in an amount of 4% w/v. How much is actually incorporated into the product microcapsules is not stated. Pheromones such as (Z)-9-tetradecenyl acetate (Z9-TDA) are used and the formulations exemplified in this patent all contain 2 or 3 pheromones co-encapsulated. Half-lives of the pheromones in sprayed microcapsules during "roof-top" studies are typically greater than 20 days when the light stabilizer is present. However, half-lives of stabilized pheromones during "field" studies on sprayed microcapsules drops to from 0.4 to 8.5 days, depending on the chemistry of the pheromone and the thickness of the microcapsule wall.

It will be appreciated that the encapsulation process of the invention does not have the effect of rendering the encapsulated material inert or ineffective as a pheromone. The encapsulating material has a degree of elasticity, so that the microcapsules will withstand the harsh mechanical conditions to which they may be subjected in aerial spraying, and a degree of porosity so that the encapsulated material is released slowly over time, for instance a pheromone is released slowly over the mating season of a target insect.

The process of the present invention provides improved encapsulation of the material to be encapsulated. Examples below show encapsulation of partially water-miscible pheromone of 9% w/v. The microcapsules produced are typically 10–100 microns, discrete, and will remain in suspension in water. The encapsulated pheromones show superior performance in preventing growth of insect population when delivered in spray form from a predetermined height. The spray process is safe, fast, less likely to contaminate ground water, results in lower exposure to the environment and other non-target species, and overall has lower labour costs. Thus the improved microcapsules, combined with the delivery process, have resulted in improved performance over existing methods such as hollow fibres, plastic laminate flakes and twist ties.

The encapsulated pheromones are preferably insect pheromones. In the notation used below to describe the structure of the pheromones, the type (E or Z) and position of the double bond or bonds are given first, the number of carbon atoms in the chain is given next and the nature of the end group is given last. To illustrate, the pheromone Z-10 C19 aldehyde has the structure;

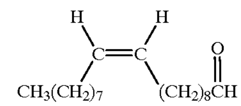

Pheromones may in fact be mixtures of compounds with one component of the mixture predominating, or at least being a significant component. Mentioned as examples of partially water-miscible significant or predominant components of insect pheromones, with the target species in brackets, are the following: E/Z-11 C14 aldehyde (Eastern Spruce Budworm), Z-10 C19 aldehyde (Yellow Headed Spruce Sawfly), Z-11 C14 alcohol (Oblique Banded Leafroller), Z-8 C12 alcohol (Oriental Fruit moth) and E,E-8,10 C12 alcohol (Codling moth).

An example of a ketone that is a pheromone is E or Z 7-tetradecen-2-one, which is effective with the oriental beetle. An ether that is not a pheromone but is of value is 4-allylanisole, which can be used to render pine trees unattractive to the Southern pine beetle.

As stated above, a tertiary amine is added to the aqueous phase containing the pheromone, surfactant and polyisocyanate. The tertiary amine is added after the addition of the water-immiscible solvent containing the pheromone and polyisocyanate. There should elapse a period of time during which the tertiary amine is in contact with the polyisocyanate and before the polyfunctional compound, for example the polyfunctional amine, is added. Desirably, on the laboratory scale when using gram quantities the time period is at least about two minutes, preferably at least about five minutes. The optimum time period may depend upon the scale of reaction, but can be determined by experimentation.

The tertiary amine, in the amount used, must be freely soluble in the water present in the reaction mixture. The simplest tertiary amine is trimethylamine and this compound, and its $C_2$, $C_3$ and $C_4$ homologues can be used. It is of course possible to use tertiary amines containing a mixture of alkyl groups, for instance methyldiethylamine. The tertiary amine can contain more than one tertiary amine moiety. It may also contain other functional groups provided that those other functional groups do not interfere with the required reaction, or the functional groups participate beneficially in the required reaction. As an example of a functional group that does not interfere there is mentioned an ether group. As examples of groups that participate beneficially there are mentioned primary and secondary amine groups, which will form urea moieties with isocyanate groups, and hydroxyl groups, which will form urethane moieties with isocyanate groups. Examples of suitable tertiary amines include compounds of the following structures:

$N[CH_2(CH_2)_nCH_3]_3$, where n is 0, 1, 2 or 3

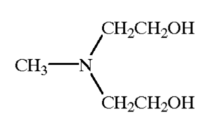

-continued

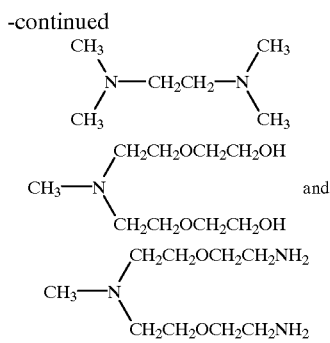

and

Of the tertiary amines triethylamine (TEA) is preferred.

The amount of the tertiary amine required is not very great. It is conveniently added in the form of a solution containing 0.5 g of TEA per 10 mL of water. Usually 0.5% by weight of this solution, based on the total weight, suffices, although 0.7% may be required in some cases. The amount used does not usually exceed 1%, although no disadvantage arises if more than 1% is used.

A surfactant is required for the aqueous dispersion. Preferably it is a nonionic surfactant. As examples of suitable surfactants there are mentioned polyvinylpyrrolidone (PVP), polyvinyl alcohol (PVA) and poly(ethoxy) nonylphenol. PVP is available at various molecular weights in the range of from about 20,000 to about 90,000 and all these can be used, but PVP of about 40,000 molecular weight is preferred. Poly(ethoxy)nonylphenols are available under the trade-mark Igepal, with various molecular weights depending on the length of the ethoxy chain. Poly(ethoxy) nonylphenols of formula:

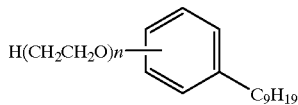

where n has an average value from about 9 to about 13 can be used but Igepal 630, indicating a molecular weight of about 630, is the preferred poly(ethoxy)nonylphenol. Other examples of surfactants include polyether block copolymers, such as Pluronic™ and Tetronic™, polyoxyethylene adducts of fatty alcohols, such as Brij™ surfactants, and esters of fatty acids, such as stearates, oleates, and the like. Examples of such fatty acids include sorbitan monostearate, sorbitan monooleate, sorbitan sesquioleate, and the like. Examples of the alcohol portions of the fatty esters include glycerol, glucosyl and the like. Fatty esters are commercially available as Arlacel C® surfactants.

Surfactants vary in their surfactant properties, and the surfactant properties affect the size of the microcapsules formed. Other things being equal, use of PVP of 40,000 molecular weight will give larger microcapsules than Igepal 630. The surfactant used, and also the degree and extent of agitation, affect the size of the microcapsules obtained. In general, they may be from about 1 to about 100 micron in size, depending upon the conditions used. For encapsulating and slowly releasing pheromones, however, it is preferred that the microcapsules have a size of at least about 10 micron to about 60 micron, and microcapsules in the range of about 20 to about 30 micron are particularly preferred.

Although less preferred, ionic surfactants can be used. Mention is made of partially neutralized salts of polyacrylic acids such as sodium or potassium polyacrylate or sodium or potassium polymethacrylate.

Dispersion of the organic phase is preferably done by stirring. The stirring is preferably slowed prior to addition of polyfunctional amine to the reaction mixture. Typical initial stirring rates are from about 500 rpm to about 2000 rpm, preferably from about 1000 rpm to about 1200 rpm.

As stated above the diameter of the microcapsules produced in this invention is preferably from about 1 micron to about 60 micron, more preferably 20 to 30 micron. Fine tuning of diameter is achieved by controlling agitation of the reaction mixture.

The polyisocyanate may be aromatic or aliphatic and may contain two, three or more isocyanate groups. Examples of aromatic polyisocyanates include 2,4- and 2,6-toluene diisocyanate, naphthalene diisocyanate, diphenylmethane diisocyanate and triphenylmethane-p,p',p"-trityl triisocyanate.

Aliphatic polyisocyanates may optionally be selected from aliphatic polyisocyanates containing two isocyanate functionalities, three isocyanate functionalities, or more than three isocyanate functionalities, or mixtures of these polyisocyanates. Preferably, the aliphatic polyisocyanate contains 5 to 30 carbons. More preferably, the aliphatic polyisocyanate comprise one or more cycloalkyl moieties. Examples of preferred isocyanates include dicyclohexylmethane4,4'-diisocyanate; hexamethylene 1,6-diisocyanate; isophorone diisocyanate; trimethylhexamethylene diisocyanate; trimer of hexamethylene 1,6-diisocyanate; trimer of isophorone diisocyanate; 1,4-cyclohexane diisocyanate; 1,4-(dimethylisocyanato) cyclohexane; biuret of hexamethylene diisocyanate; urea of hexamethylene diisocyanate; trimethylenediisocyanate; propylene-1,2-diisocyanate; and butylene-1,2-diisocyanate. Mixtures of polyisocyanates can be used.

Particularly preferred polyisocyanates are polymethylene polyphenylisocyanates of formula

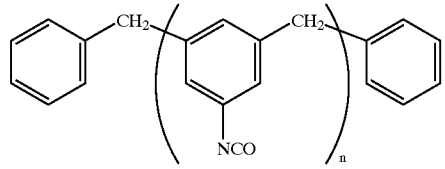

wherein n is 2 to 4. These compounds are available under the trade-mark Mondur-MRS. The mole equivalent ratio of total primary amine functionality to isocyanate functionality in the system is preferably about 0.8:1 to 1:1.2, and more preferably about 1:1.1.

The polyfunctional compound containing amine and/or hydroxy functional groups contains at least two functional groups selected from primary amine, secondary amine and hydroxy groups, and should be water-soluble. Examples of suitable compounds include ethylene diamine, diethylene triamine and compounds of the general formula

wherein m takes a value from 1 to 8, and each R is independently hydrogen or methyl. Also useful are compounds whose structure is similar to the above formula, but which have one or more oxygen atoms present in ether linkages between carbon atoms. It is preferred that R is hydrogen, especially at the terminal amino groups. Aromatic diamines, for example toluene diamine, can be used. Mixtures of polyfunctional compounds can be used. Mention is made of tetraethylene pentamine (TEPA) and pentamethylene hexamine, of which TEPA is preferred.

As the water-immiscible solvent there is used a non-polar solvent that is inert to the encapsulation reaction, but in which the polyisocyanate and the material to be encapsulated can be dissolved or suspended. As suitable solvents there are mentioned hydrocarbon solvents, for example kerosene and alkyl benzenes such as toluene, xylene, and the like. It is desirable to use only a small amount of the solvent; amounts up to about 5%, based on the amount of water, usually suffice and in most cases it is preferred to use the solvent in an amount of about 3% or less.

The reaction proceeds readily at room temperature, but it may be advantageous to operate below room temperature, down to about 0° C., preferably at about 15° C.

In a preferred embodiment, the product of the microencapsulation process is a plurality of microcapsules having a size in the range of from about 10 to about 60 micron, more preferably about 20 to about 30 micron, and an encapsulated pheromone contained within the polyurea or polyurea/polyurethane shell. The capsules will remain suspended in water, i.e., they have a specific gravity of less than 1, and the shell has elasticity yet porosity to permit slow release of the encapsulated pheromone. The microcapsules can be suspended in water to give a suspension suitable for aerial spraying. The suspension may contain a suspending agent, for instance a gum suspending agent such as guar gum, rhamsan gum or xanthan gum.

It has not been found necessary to include a light stabilizer to protect the encapsulated pheromone. Incorporation of a light stabilizer, if needed, is within the scope of the invention, however. Suitable light stabilizers include the tertiary phenylene diamine compounds disclosed in Canadian Patent No. 1,179,682, the disclosure of which is incorporated by reference. The light stabilizer can be incorporated by dissolving it, with the pheromone and polyisocyanate, in the water-immiscible solvent. Alternatively, a light stabilizer can be incorporated in the polyurea shell as taught in Canadian Patent No. 1,044,134, the disclosure of which is also incorporated by reference.

To assist in determining distribution of sprayed microcapsules it is possible to include a coloured dye in the microcapsules. The dye should be oil-soluble and can be incorporated, with the pheromone and the polyisocyanate, in the water-soluble solvent. Alternatively, or additionally, an oil-soluble or oil-dispersible dye can be included in the aqueous suspension of microcapsules, where it is absorbed by the microcapsule shell. Suitable oil-soluble or oil-dispersible dyes can be obtained from DayGlo Color Corporation, Cleveland, Ohio, and include Blaze Orange, Saturn Yellow, Aurora Pink, and the like.

Although the invention has been described largely with reference to encapsulation of partially water-miscible pheromones, other molecules that are active in nature can be encapsulated in a similar manner. As examples there are mentioned linalool, terpineol, fenchone, and keto-decenoic acids and hydroxy-decenoic acids, which encourage activity of worker bees. Encapsulated 4-allylanisole can be used to make pine trees unattractive to the Southern pine beetle. Encapsulated 7,8-epoxy-2-methyloctadecane can be used to combat the nun moth or the gypsy moth. Natural flavours and fragrances can be encapsulated. All these applications, and microcapsules containing these materials, are within the scope of the present invention.

The following non-limiting examples are provided to more particularly illustrate the present invention.

Partially Water-miscible Pheromones

EXAMPLE 1

Tetradecanal (TD) (1 g) and toluene (3 g) were mixed with polymethylene polyphenylisocyanate (Mondur-MRS*) (4 g). The mixture was added to a 500 mL glass reactor containing deionized (DI) water (100 mL) and PVP of about 40,000 molecular weight (1 g). The solution was stirred at 1000 rpm for 5 minutes, then a small amount of dilute aqueous TEA (0.5 g/10 mL of water) was added. After 5 minutes, stirring was reduced to approximately 800 rpm for the slow addition of TEPA (50 g of a 5% aqueous solution). The stirring continued for 4 hours, then agitation was stopped. Discrete spherical microcapsules were produced with a article size range of 10 to 100 microns.

EXAMPLE 2

The procedure described in Example 1 was used, except that p-xylene was used as the diluent in place of toluene. TD (5 g) was mixed with Mondur-MRS* (10 g) and p-xylene (15 g). The mixture was added into DI water (200 mL) containing PVP (2 g). The organic phase was dispersed with a stirring rate of 1000 rpm. TEA (0.5 g in water) was added after 5 minutes. After a further 5 minutes, TEPA (50 g of 5% aqueous solution) was added dropwise while the reaction mixture was stirred at approximately 800 rpm. The reaction mixture was stirred for 4 hours. Discrete microcapsules of 10 to 90 mm were obtained. These microcapsules remained suspended in water.

EXAMPLE 3

Decyl aldehyde (DA) (1 g), Mondur-MRS (4 g) (a trademark of Bayer Company) and toluene (3 g) were added into a 500 mL glass reactor, which contained PVP (1 g) and DI water (100 mL). The mixture was stirred at a rate of 1200 rpm for a period of one minute. TEA (0.5 g) was diluted with DI water (15 mL) and the solution added to the reactor. After a further 5 minutes, TEPA (38 g, 5% aqueous solution) was added dropwise. The reaction was stirred at 1200 rpm for an additional 10 minutes. The stirring rate was then dropped to 800 rpm for 2 hours, then reduced to 500 rpm for 2 hours. During the course of the reaction discrete capsules were formed. The capsules were in the size range of 10 to 100 mm.

COMPARATIVE EXAMPLE A

This example is comparative and illustrates an attempt to prepare DA microcapsules in the absence of a tertiary amine. DA (1 g), Mondur-MRS* (4 g) and toluene (3 g) were introduced into a mixture of PVP (1 g) and DI water (100 mL) in a 500 mL glass reactor. The solution was stirred at 1200 rpm for 2 minutes. TEPA (5% aqueous solution) was metered into the reactor while stirring at approximately 800 rpm. Coagulation was observed after the addition of 5 mL of the TEPA solution. In total, 15 g of TEPA solution was added and the reaction was allowed to proceed for 2 hours. The isolated product was in the form of coagulum.

EXAMPLE 4

The procedure outlined in Comparative Example A was adopted, but TEA was used as tertiary amine, TD was used in place of DA, xylene was used in place of toluene and the ratio of TD to inert diluent was changed from 1:3 to 1:9. TD (3 g) and p-xylene (27 g) were mixed with Mondur-MRS* (8 g). The mixture was then added into DI water (ISOmL)

containing PVP (2 g) in a glass reactor. The reactants were stirred at 1000 rpm to produce a uniform suspension. While the mixture was stirred at approximately 800 rpm, TEA (0.5 g in 10 mL) was added. Then further TEPA (12 g) in DI water (38 mL) was added. Stirring was continued for 3 hours. The resulting discrete capsules were characterized by optical microscope and ranged in particle size from 20 to 100 micron. The capsules remained suspended in water.

EXAMPLE 5

PVP (1 g) was added into water (325 g) in a 1 L glass reactor. Z-10-nonadecenal (45 g) and p-xylene (15 g) were mixed with Mondur MS (6 g), which was then added into the reactor under stirring at 1800 rpm. After two minutes, TEA (0.5 g in 5 mL of water) was added dropwise, followed by dropwise addition of TEPA (4 g in 20 mL water). Reaction continued for 40 minutes after the finish of the addition of TEPA under agitation around 1000 rpm. Then, mixture of 1.5 g rhamsan gum, 2 g proxel (1,2-benzisothiazoline-3-one, a preservative) and 0.2 g Igepal CO-630 emulsifier in 50 g water was introduced into the reactor. The microcapsules ranged in size from 5 to 40 micron. Analysis of the product revealed that the solid microcapsules constituted 16% by weight of the reaction product, and the encapsulated Z-10-nonadecenal constituted 9.47% by weight of the product.

The compound E/Z-11-tetradecenal was incorporated in discrete microcapsules using the procedure of Example 5.

EXAMPLE 6

PVP (11 g) was dissolved in 3490 g water in a 8 L size reactor. An oil phase containing Z-10-nonadecenal (479 g), p-xylene (159 g) and Mondur MS (64 g) was added into the reactor under stirring at 1800 rpm. TEA (2 g in 50 g water) was added to start the polymerization, followed by addition of TEPA (42 g in 200 g water) at the rate of 3 mL/min. After the finish of the addition of TEPA, the suspension was stirred under 1000 rpm for 40 min. A mixture of rhamsan gum (16 g), proxel (20 g) and Igepal CO-630 (2 g) in 500 g water was added into the reactor, and mixed well with the suspension of capsules. Analysis of the product revealed a solid content of 16%, containing 9.51% of encapsulated Z-10-nonadecenal (based on total).

EXAMPLE 7

PVP (10 g) was dissolved in DI water (4.2 L) in an 8 L reactor, and the mixture was stirred at 1400 rpm. E-11-Tetradecen-1-ol (500 g) was dissolved in p-xylene (160 g); isophorone diisocyanate (IPDI) (84.8 g) was added to this solution and the mixture was added to the reactor at a stirring rate of 1200 rpm. TEA (1 g) was diluted with DI water (20 ml) and the solution was added to the reactor at a stirring rate of 1700 rpm. After five minutes, TEPA (40 g) in water (80 ml) was added at a rate of 3 ml per minute. After completion of addition of the TEPA, the suspension was stirred at 1650 rpm for 30 minutes. Discrete microcapsules of 10 to 80 micron were obtained.

The following alcohols were incorporated in discrete microcapsules by the procedure of Example 7:

Z-11 C14 alcohol

Z-8 C12 alcohol

E,E-8,10 C12 alcohol.

Pheromone Formulation Performance

To monitor the physical performance following aerial application, two parameters were measured: (1) air concentrations of pheromone released from the microencapsulated formulation and (2) the amount of formulation remaining on the foliage over time.

Methods for E/Z-11-tetradecenal

An approximately 5 ha site (mixed balsam fir, maple, and black spruce) was selected for aerial application (~100 g/ha) of microencapsulated formulation of the spruce budworm sex pheromone (95/5 E/Z-11-tetradecenal).

Formulation deposit was assessed, in part, by deploying water sensitive deposit cards throughout the site and by collecting foliage samples following the aerial spray. Samples were taken at lower, mid, and upper crown levels of the 10 meter spruce trees. Foliage sampling was continued, along with air sampling, for the duration of the experiment as follows.

Field Evaluation

Air Determinations

Air sampling was initiated within 24 hours following formulation application and was repeated every four or five days through the duration of the estimated adult flight period. Two sampling locations were designated near the center of the about 5 ha test plot and separated by approximately 20 feet. Two cubic meters of air was drawn through 25 g of absorbent (in a 3×20 cm glass column) over a two hour period. The absorbent was stored at −10° C. until solvent extraction, concentration, and quantification by gas chromatography-electroantennogram detection (GC-EAD).

Foliage Determinations

Branch samples from two, six point transit intersections were collected within 24 hours of formulation application and approximately every four or five days thereafter until the end of the adult flight season. Foliage samples were stored at −10° C. until solvent extraction and quantification by GC-FID and/or GC/EAD.

Lab Evaluation

Field/lab evaluation protocols were also put in place. Pheromone formulation is applied to foliage surface in known quantities and the foliage is exposed to a variety of environmental conditions for several weeks duration (control for wind, rain, and sun impact on formulation adhesion and release rate). Foliage samples are periodically taken and the released pheromone quantified as well as residual pheromone remaining on the foliage over time.

Formulation Assessment (a) Air samples were analyzed for pheromone levels by the GC-EAD technique. These samples contained low levels of the pheromone (c 1 mg/m$^3$) at the beginning of the experiment and very low levels (1~10 pg/m$^3$) three-four weeks later.

(b) Foliage samples were collected for analysis.

(c) Laboratory evaluation of pheromone formulation release characteristics known amounts of the formulation were placed on small spruce trees and these trees were maintained at different environmental conditions. In all the tests conducted the amount of pheromone-containing formulation remained on the foliage, even after four weeks on the trees exposed to all the elements (wind, rain and sun); was about 5–10% of that applied at the beginning of the experiment. Sun and rain effects on formulation longevity were apparent. Branch samples taken over the test period were examined for pheromone release. Pheromone was still releasing from the formulation on the branches for the full four week test period.

Z-10-Nonadecenal

Methods for Z-10-nonadecenal

The pheromone formulation was aerially applied by helicopter at a rate of ~100 g of active ingredient/ha to a test site, and a control site containing black spruce. Three spruce trees were also sprayed (backpack sprayer) with additional formulation for the purpose of formulation evaluation.

Formulation deposit was assessed in part with water sensitive droplet cards placed in the plot prior to spray.

Field Evaluation

Air Determinations

As described above for E/Z-11-tetradecenal.

Foliate Determinations

As described above for E/Z-11-tetradecenal.

Results

Laboratory formulation evaluation studies that were carried out through the spring and summer demonstrate that a four week sustained release of the sawfly pheromone (Z-10-nonadecenal) from the MEC formulation applied to small spruce trees was achieved. Approximately 5% of the applied formulation remained on trees exposed to the elements over a four week period. Low levels of released pheromone were still being detected from these foliage samples after about five weeks. The results of the laboratory evaluation indicate that formulation has a life-span of at least four weeks with sustained release.

What is claimed is:

1. A process for encapsulating a partially water-miscible organic material within a polyurea or polyurethane shell, which process comprises:

(a) providing an aqueous phase containing a surfactant;

(b) dispersing in said aqueous phase a water-immiscible organic solvent in which the partially water-miscible material to be encapsulated and a polyisocyanate are dissolved or dispersed, to form a dispersion of droplets of organic solvent in the continuous aqueous phase;

(c) adding to the dispersion a water-soluble tertiary amine;

(d) thereafter adding to the dispersion a polyfunctional compound containing functional groups selected from the group consisting of primary amine, secondary amine and hydroxy groups, whereby there is formed discrete capsules composed of the material encapsulated in a polyurea or polyurethane shell.

2. A process according to claim 1, wherein the tertiary amine is added to the aqueous dispersion at least about two minutes before the addition of the polyfunctional compound to the aqueous dispersion.

3. A process according to claim 2, wherein the tertiary amine is triethylamine.

4. A process according to claim 1, wherein the encapsulated material is an alcohol, aldehyde, ketone, acid, ether or mercaptan.

5. A process according to claim 1 wherein the encapsulated material is an organic compound that has a molecular weight in the range of from about 100 to about 400 and has one, two or three oxygen atoms.

6. A process according to claim 1, wherein a partially water-miscible pheromone is encapsulated and the surfactant is a polyvinylpyrrolidone (PVP).

7. A process according to claim 1, wherein a partially water-miscible pheromone is encapsulated and the surfactant is a poly(ethyleneoxy) nonylphenol.

8. A process according to claim 1, wherein the polyisocyanate is a polymethylene polyphenylisocyanate.

9. A process according to claim 1, wherein the polyisocyanate is selected from the group consisting of 2,4-toluene diisocyanate, 2,6-toluene diisocyanate, isophorone diisocyanate, naphthalene diisocyanate and 2,4,6-toluene triisocyanate.

10. A process according to claim 8, wherein the polymethylene polyphenylisocyanate is of the formula:

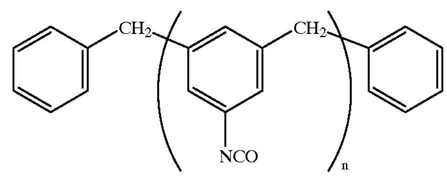

wherein n is 2 to 4.

11. A process according to claim 1, wherein the polyfunctional compound is an amine that contains at least 4 nitrogen atoms.

12. A process according to claim 11 wherein the polyfunctional compound is tetraethylene pentamine.

13. A process according to claim 1, wherein the polyurea shell diameter is from about 10 microns to about 60 microns.

* * * * *